United States Patent
Inoue et al.

(10) Patent No.: US 10,400,841 B2
(45) Date of Patent: Sep. 3, 2019

(54) DYNAMIC DAMPER, VIBRATION ISOLATOR, AND METHOD FOR MANUFACTURING MAGNETIC VISCOUS ELASTOMER

(71) Applicants: HONDA MOTOR CO., LTD., Tokyo (JP); National University Corporation Kanazawa University, Kanazawa-shi, Ishikawa (JP)

(72) Inventors: Toshio Inoue, Saitama (JP); Toshihiko Komatsuzaki, Ishikawa (JP)

(73) Assignees: HONDA MOTOR CO., LTD., Tokyo (JP); NATIONAL UNIVERSITY CORPORATION KANAZAWA UNIVERSITY, Kanazawa-shi (JP)

( * ) Notice: Subject to any disclaimer, the term of this patent is extended or adjusted under 35 U.S.C. 154(b) by 0 days.

(21) Appl. No.: 15/558,469

(22) PCT Filed: Mar. 10, 2016

(86) PCT No.: PCT/JP2016/057576
§ 371 (c)(1),
(2) Date: Sep. 14, 2017

(87) PCT Pub. No.: WO2016/148011
PCT Pub. Date: Sep. 22, 2016

(65) Prior Publication Data
US 2018/0066723 A1    Mar. 8, 2018

(30) Foreign Application Priority Data

Mar. 16, 2015 (JP) .................................. 2015-051840

(51) Int. Cl.
*F16F 7/10* (2006.01)
*F16F 15/03* (2006.01)
(Continued)

(52) U.S. Cl.
CPC ............ *F16F 7/1011* (2013.01); *F16F 7/108* (2013.01); *F16F 15/03* (2013.01); *F16F 1/361* (2013.01);
(Continued)

(58) Field of Classification Search
CPC .......... F16F 15/03; F16F 15/035; F16F 1/361; F16F 2222/06; F16F 2228/066; F16F 2230/18
(Continued)

(56) References Cited

U.S. PATENT DOCUMENTS

| | | | | |
|---|---|---|---|---|
| 5,775,155 A | * | 7/1998 | Kato | B21C 25/08 72/260 |
| 5,814,999 A | * | 9/1998 | Elie | B60G 7/006 324/662 |
| 5,816,587 A | * | 10/1998 | Stewart | B60G 7/006 280/5.516 |
| 6,053,291 A | * | 4/2000 | Shibahata | F16F 7/09 188/266.1 |
| 9,616,727 B2 | * | 4/2017 | Ogawa | B60G 13/003 |
| 9,835,218 B2 | * | 12/2017 | Inoue | F16F 7/1011 |

(Continued)

FOREIGN PATENT DOCUMENTS

| | | |
|---|---|---|
| CN | 101324257 | 12/2008 |
| CN | 103129377 | 6/2013 |

(Continued)

OTHER PUBLICATIONS

International Search Report, dated Apr. 12, 2016 (Apr. 12, 2016), Application No. PCT/JP2016/057576, 4 pages.
Chinese Office Action dated Oct. 19, 2018, 6 pages.

*Primary Examiner* — Thomas J Williams
(74) *Attorney, Agent, or Firm* — Rankin, Hill & Clark LLP

(57) ABSTRACT

This dynamic damper is provided with a movable part that can be moved by external input, and an excitation coil for (Continued)

generating a magnetic field of an intensity corresponding to a supplied electric current. The movable part is configured to include: first and second magnetic cores in which magnetic paths, which are pathways for the magnetic field generated by the excitation coil, are configured as annular closed magnetic paths; and a magnetic viscous elastomer of which the viscous properties change in accordance with the size of the magnetic field generated by the excitation coil. The magnetic viscous elastomer is arranged so as link at least one location in the first and second magnetic cores and constitutes a closed magnetic path.

11 Claims, 10 Drawing Sheets

(51) Int. Cl.
*F16F 7/108* (2006.01)
*F16F 1/36* (2006.01)
(52) U.S. Cl.
CPC ....... *F16F 2222/06* (2013.01); *F16F 2226/04* (2013.01); *F16F 2228/066* (2013.01); *F16F 2230/18* (2013.01); *F16F 2234/02* (2013.01)
(58) Field of Classification Search
USPC .................................. 188/267, 267.1, 267.2
See application file for complete search history.

(56) References Cited

U.S. PATENT DOCUMENTS

| | | | | |
|---|---|---|---|---|
| 10,161,467 | B2* | 12/2018 | Terashima | .............. F16F 1/361 |
| 2013/0127098 | A1 | 5/2013 | Kim et al. | |
| 2015/0228267 | A1* | 8/2015 | Inoue | .................. G10K 11/175 |
| | | | | 381/71.4 |
| 2016/0153846 | A1* | 6/2016 | Inoue | ..................... G01L 1/125 |
| | | | | 73/862.632 |
| 2016/0333957 | A1* | 11/2016 | Inoue | ..................... F16F 7/1011 |
| 2017/0219039 | A1* | 8/2017 | Inoue | ..................... F16F 7/1011 |
| 2017/0275438 | A1* | 9/2017 | Kobayashi | ............... C08K 9/06 |
| 2017/0328433 | A1* | 11/2017 | Terashima | ............. F16F 1/361 |
| 2017/0331357 | A1* | 11/2017 | Terashima | ............. F16F 1/361 |
| 2017/0363171 | A1* | 12/2017 | Inoue | .................. F16F 15/1442 |
| 2018/0180131 | A1* | 6/2018 | Inoue | ..................... F16F 7/1011 |

FOREIGN PATENT DOCUMENTS

| | | | | |
|---|---|---|---|---|
| DE | 102014107394 | A1 * | 11/2015 | ............... B60G 9/02 |
| JP | 3-194238 | | 8/1991 | |
| JP | 2013-032834 | | 2/2013 | |
| JP | 2015-045369 | | 3/2015 | |
| WO | 2012/026332 | | 3/2012 | |

* cited by examiner

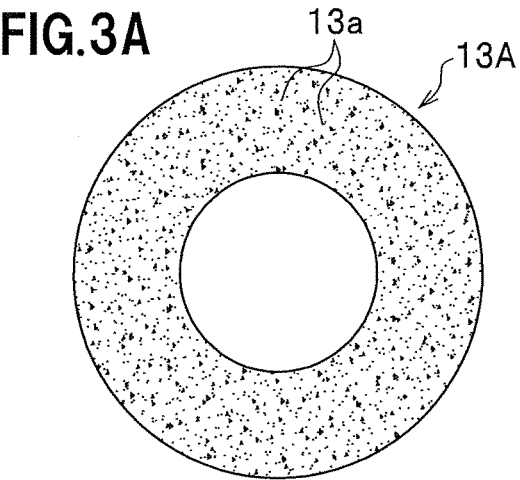
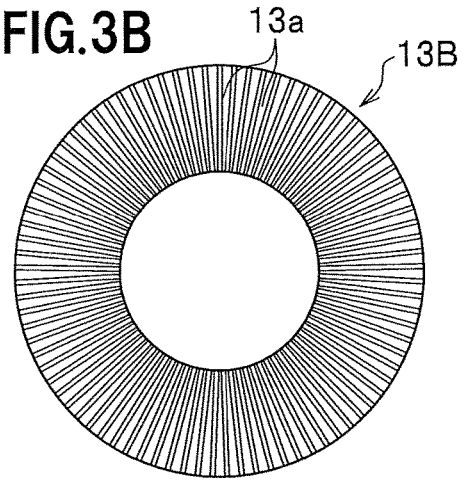
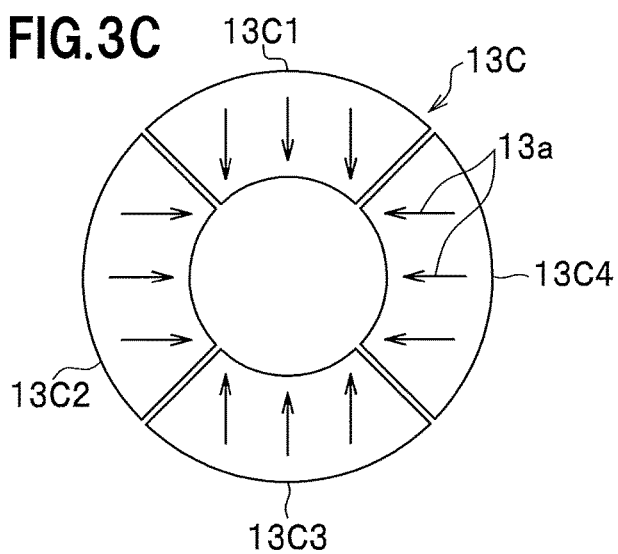
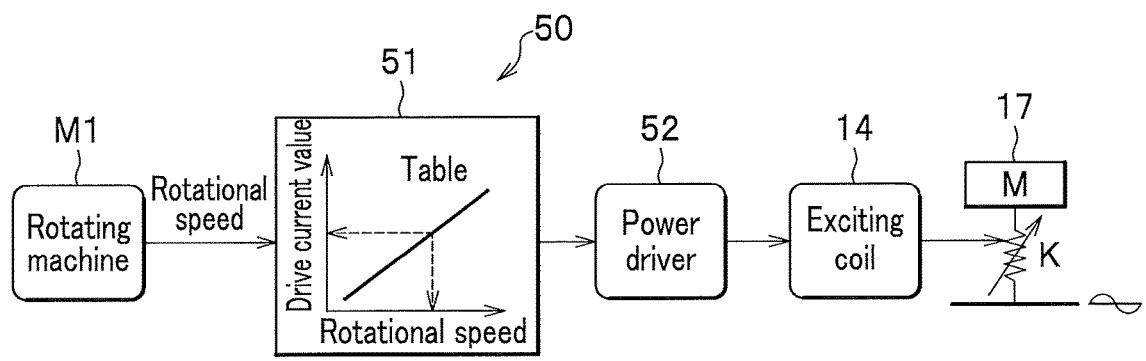

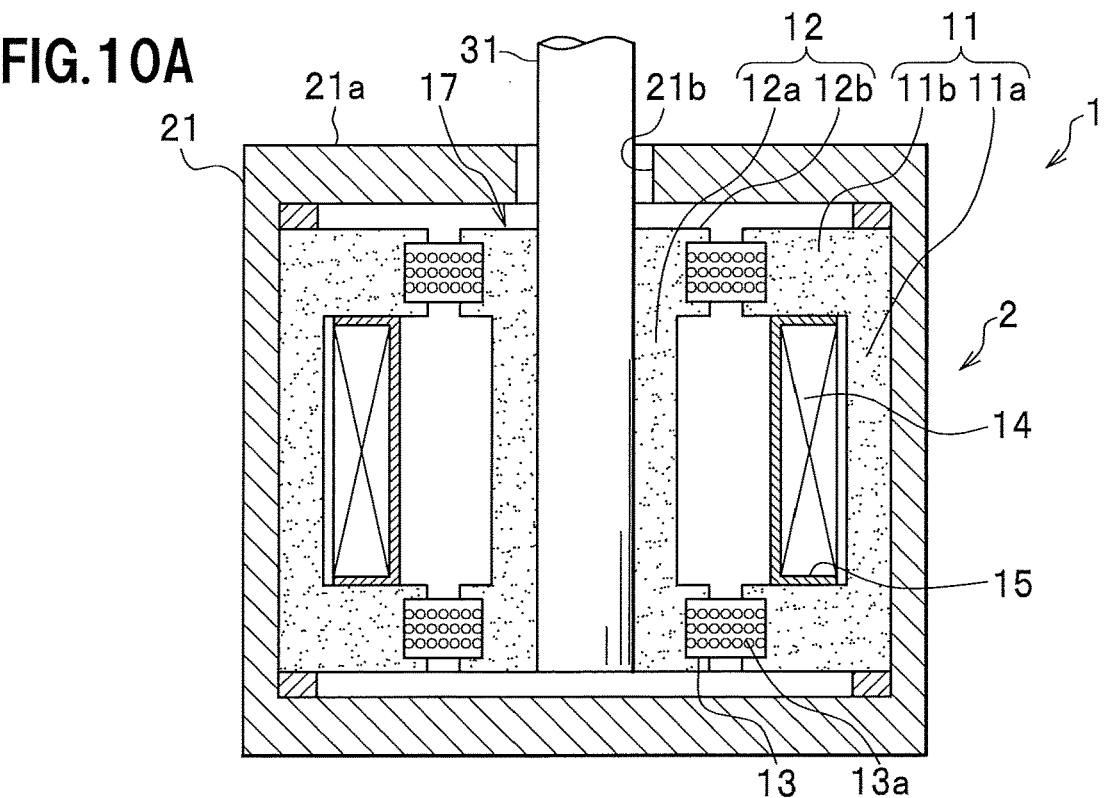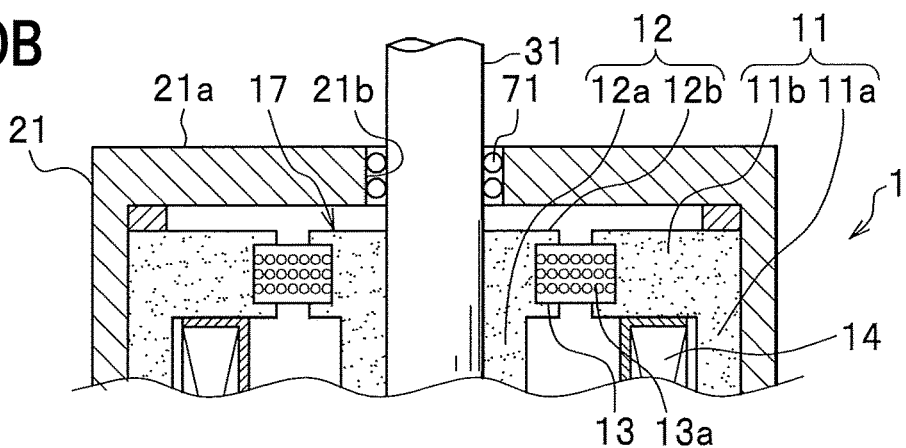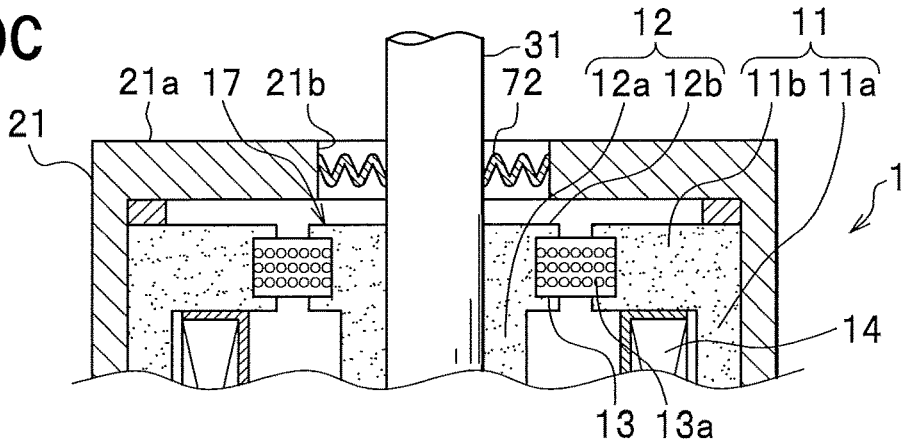

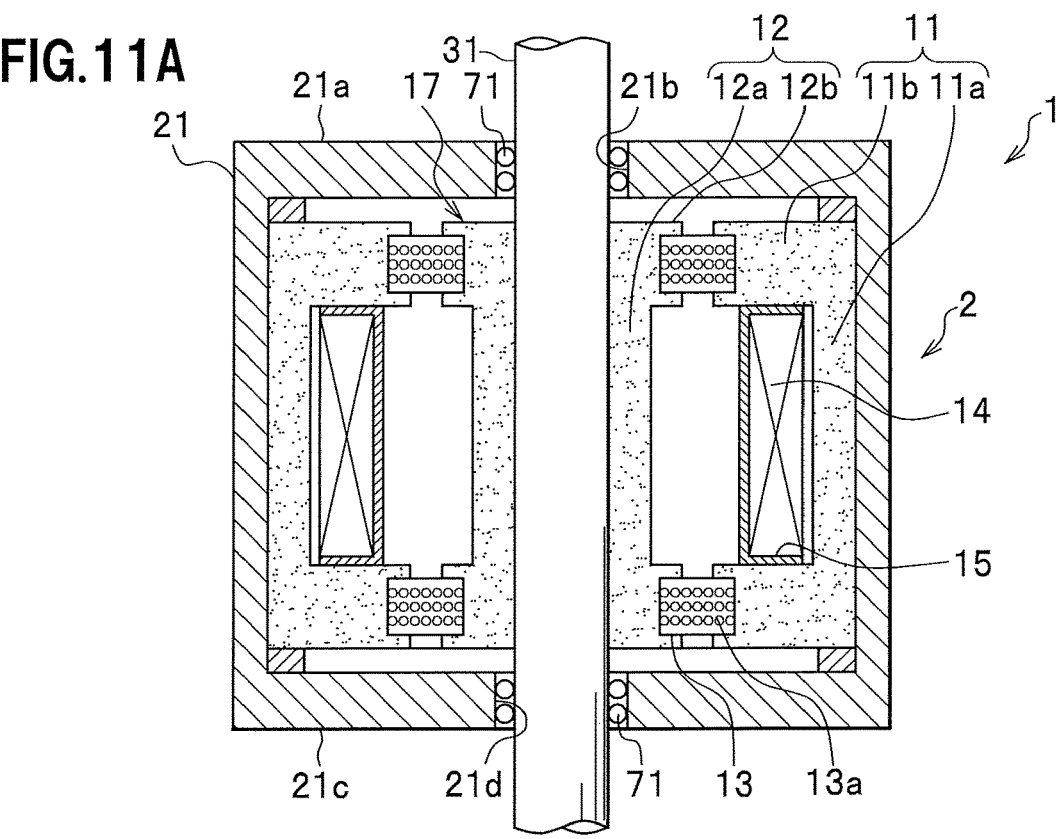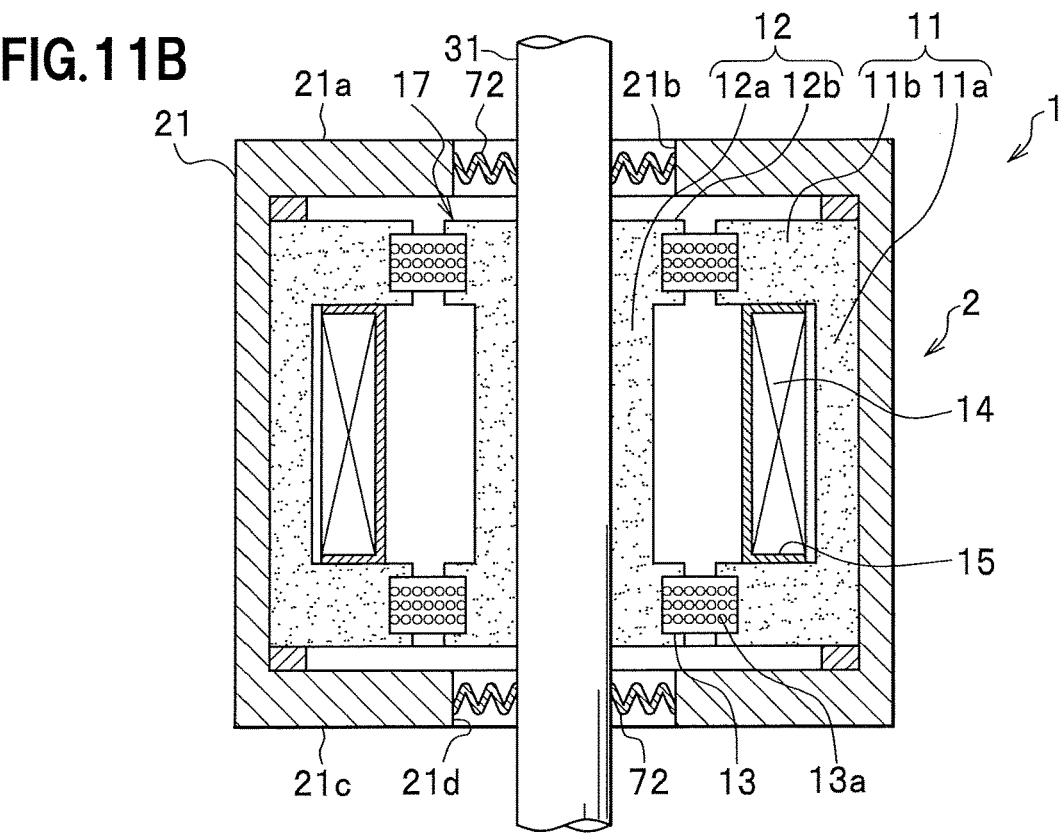

DYNAMIC DAMPER, VIBRATION ISOLATOR, AND METHOD FOR MANUFACTURING MAGNETIC VISCOUS ELASTOMER

TECHNICAL FIELD

The present invention relates to a dynamic damper, a vibration isolator, and a method for manufacturing magnetic viscous elastomer.

BACKGROUND ART

In conventional passive-type dynamic damper, an eigenvalue of the vibration absorber is uniquely determined because physical properties of the configuration elements are fixed. Accordingly, when a frequency of the disturbance vibration matches the eigenfrequency of the dynamic damper, a high damper effect is given. However, when the frequency of the disturbance vibration is slightly different from the eigenfrequency or when the frequency of the disturbance vibration varies as time passes, i.e., when the frequency is in an unstable state, the damper effect of the dynamic absorber cannot be fully given. Regarding this problem, a method of designing an optimal tuning and optimal damping to keep a damping effect over a certain frequency band is known. However, this cannot provide a damping effect that is lower than the response amplitude defined by the fixed point (unmoving point) on the frequency response curve.

On the other hand, as a counter part of the passive type of damping device, an active mass damper is known. In this method, an actuator for forcibly vibrating a mass is installed in the device in addition to the mass element. Accordingly, any arbitrary damping force can be generated theoretically, though any disturbance is applied. As a result, this method can provide a high damping effect irrespective of normal and abnormal states. However, there are known problems in that a device to directly apply outer energy becomes complicated, that it becomes necessary to design a control system to avoid unstableness, and that a cost is high. Further, there is a semi-active type of a control method which is an intermediate type between the passive type and the active type. In the semi-active type of damper, a physical property of one of configuration elements, which is originally fixed in the passive type system, is made variable with some means to have variability in the physical characteristic in the system. This enables the system control while the variation due to a disturbance is tracked to some extent. The semi-active type of control method has advantageous effects such as a control performance close to the active type of control method with reliability and stability inherently derived from the passive elements and provides a device at a cost which is lower than that of the active type of control.

Patent Document 1 disclosed a configuration in which an elastic modulus of the magnetic elastomer is changed by application of the magnetic field generated by an exciting coil by arranging an exciting coil at an outer circumferential area of the magnetic viscoelastic elastomer having elastic modulus which varies by application of the magnetic field.

PRIOR ART

Patent Document

Patent Document 1: WO2012/026332

SUMMARY OF THE INVENTION

Problem to be Solved by Invention

However, Patent Document 1 disclosed a configuration in which a magnetic field is applied to the magnetic elastomer using an electric magnet. However, the magnetic elastomer and the electric magnet are disposed as a magnetic open circuit. In other words, the electric magnet is placed near the magnetic elastomer, so that magnetic flux leaks to other than the magnetic elastomer, which results in that the magnetic field cannot be applied to the magnetic elastomer efficiently.

The present invention aims to provide a dynamic damper and a vibration isolator capable of adjusting a physical property of the magnetic elastomer by applying the magnetic field to the magnetic elastomer efficiently.

Means for Solving Problem (1) The present invention which has solved the above problems provides a dynamic damper comprising:
a housing made of non-magnetic material;
a movable part movable in response to an external input force;
an exciting coil that generates a magnetic field having an intensity corresponding to a current supplied thereto;
a magnetic viscoelastic elastomer having a magnetic viscoelastic property controlled in accordance with a magnitude of magnetic field generated by the exciting coil;
a plurality of magnetic members forming a magnetic path transmitting the magnetic field generated by the exciting coil as an annular closed magnetic circuit,
wherein the movable parts includes at least one of a plurality of the magnetic members; and
wherein the magnetic viscoelastic elastomer is disposed to form the closed magnetic circuit by connecting one of the magnetic members forming the movable part to another one of the magnetic members.

According to the present invention, when a magnetic field is applied by the exciting coil, the magnetic field is applied to the magnetic viscoelastic elastomer through a plurality of magnetic members (the magnetic viscoelastic elastomer forming a magnetic path), which can change a stiffness of the magnetic viscoelastic elastomer (elastic material) in accordance with an intensity of the magnetic field generated by the exciting coil.

According to this, in the movable part disposed through the elastic member, the moving state can be adjusted by the stiffness of the elastic member, so that the vibration isolation control can be performed in accordance with an external input force.

Further, a magnetic closed circuit can be formed by arrangement in which the magnetic members forming a magnetic path from the exciting coil inside the housing made of a non-magnetic material, so that the magnetic field from the exciting coil can be applied to the magnetic viscoelastic elastomer efficiently, which enhances the vibration isolation performance (in the applied magnetic field) and provides power saving.

(2) Another invention may provide the dynamic damper according to (1), wherein a plurality of the magnetic members comprises a first magnetic core and a second magnetic core that forms the movable part;

wherein the magnetic viscoelastic elastomer is connected between the first magnetic core and the second magnetic core in a direction perpendicular to a movable direction; and wherein the magnetic viscoelastic elastomer includes magnetic particles which are arranged in the direction perpendicular to the movable direction.

According to this embodiment, the magnetic particles in the magnetic viscoelastic elastomer are arranged in a direction perpendicular to a movable direction of the movable member. As a result, changing a bonding force between the magnetic particles arranged in the magnetic viscoelastic elastomer in accordance with magnetic flux flowing in the magnetic circuit provides a variable width in the stiffness of the magnetic viscoelastic elastomer against an input force in the movable direction of the movable part, which enhances the vibration isolation performance of the dynamic damper.

(3) A still another invention may provide, in the dynamic damper according to (2), the first magnetic core includes; a hollow circular cylinder disposed between the housing and the exciting coil, and a first extending part extending from the hollow circular cylinder toward an inside of a circumferential direction. The second magnetic core includes: a pillar extending in an axial direction of the hollow circular cylinder; and a second extending part extending on an outside of a circumferential direction from the pillar. The magnetic viscoelastic elastomer has an annular shape to connect an inner end of the first extending part and the outer end of the second extending part. The movable part includes: the second magnetic core; and a mass member made of a non-magnetic material connected to an outer circumferential surface of the pillar. The dynamic damper is an active dynamic damper that adjusts a vibration state of the movable member in accordance with a stiffness of the magnetic viscoelastic elastomer.

According to this invention, an active dynamic damper in which the magnetic viscoelastic elastomer is disposed in a magnetic closed circuit can be provided, which can enhance a vibration isolation performance of the active dynamic damper.

Further, because it is possible to operate the second magnetic core as a mass in addition to the mass member, which can be down-size the device with weight saving.

(4) A yet another invention may provide the dynamic damper according to (3), further comprising a permanent magnet that is disposed in the first magnetic core and forms the magnetic path in parallel to the magnetic path formed in the first magnetic core by the magnetic field applied by the exciting coil, wherein the permanent magnet is enclosed by a mass member made of the non-magnetic material.

According to the present invention, even if an application current to the exciting coil is kept to be zero, the magnetic viscoelastic elastomer has an elastic modulus as a reference, so that power consumption can be saved.

In addition, it is possible to decrease or increase the elastic modulus of the magnetic viscoelastic elastomer to adjust the stiffness from the reference stiffness by decreasing and increasing the magnetic force from the magnetic force by the permanent magnet applied to the magnetic viscoelastic elastomer.

(5) A further invention may provide a dynamic damper according to (3) or (4), the first extending part, a structure of the first extending part, the second extending part, and the magnetic viscoelastic elastomer form a structure which comprises a plurality of the structures arranged in an axial direction of the first and second magnetic cores. Out of a plurality of the structures, the magnetic viscoelastic elastomer in one of the structures disposed on an outer side in the axial direction is made, thinner in the axial direction, longer in the circumferential direction, or less include the magnetic particles, than the magnetic viscoelastic elastomer in another one of the structures disposed on an inside in the axial direction.

According to this invention, the structures are changed between different layers. This equalizes the stiffness of the magnetic viscoelastic elastomers between outer and inner layers, so that it is possible to change the stiffness efficiently.

A plurality of the structures are provided to the apparatus, which can be used for fail-safe operation.

(6) A still further invention may provide a vibration isolator comprising:

the active damper according to (2) and a shaft. The first magnetic core comprises: a hollow circular cylinder disposed between the housing and the exciting coil, and a first extending part extending from the hollow circular cylinder toward an inside of a circumferential direction. The second magnetic core includes: a pillar extending in an axial direction of the hollow circular cylinder; and a second extending part extending on an outside of a circumferential direction from the pillar. The magnetic viscoelastic elastomer has an annular shape to connect an inner end of the first extending part and the outer end of the second extending part. The movable part is connected to the shaft protruding on outside in the axial direction from the housing, one end of the shaft being connected to a vibration isolation target.

In this invention, the vibration isolator configured in which the magnetic viscoelastic elastomer is disposed in the closed magnetic circuit, which can enhance the vibration isolation performance of the vibration isolator.

(7) A yet further invention may provide a vibration isolator comprising:

a housing made of non-magnetic material;

a swingable shaft swingably disposed inside the housing, wherein at least one end thereof is connected to an outside;

a magnetic viscoelastic elastomer disposed to be elastically deformed by the input force from the swingable shaft, the magnetic viscoelastic elastomer having an elastic modulus which is variable in accordance with a magnitude of the applied magnetic force, the magnetic viscoelastic elastomer including magnetic particles in an elastic material;

an exciting coil that is disposed inside the housing and applies a magnetic force to the magnetic viscoelastic elastomer;

at least two magnetic core parts disposed between the housing and the exciting coil to form a magnetic path through the magnetic viscoelastic elastomer, wherein the two magnetic core parts each include:
 a hollow circular cylinder disposed at outer circumference of the swingable shaft;
 an extending part extending from one end on outer side in the axial direction of the hollow circular cylinder toward an inside of a circumferential direction,
 an extending part extending from one end on outer side in the axial direction of the hollow circular cylinder toward an inside of a circumferential direction, wherein the magnetic viscoelastic elastomer has a hollow circular cylindrical shape to connect ends, on inner sides in the axial direction, of the two magnetic core parts; and transmitting means extending from the swingable shaft in a direction perpendicular to the axial direction and abutting an inner circumferential surface of the magnetic viscoelastic elastomer to transmit a displacement of the swingable shaft relative to the housing to the magnetic viscoelastic elastomer.

According to this invention, when an input force is applied to the housing or the swing shaft, so that the swing shaft is displaced relative to the housing, a load according to the displacement is applied to the magnetic viscoelastic elastomer through the transmitting means.

Accordingly, the stiffness of the magnetic viscoelastic elastomer can be changed, so that vibration isolation against an input force in the direction perpendicular to the axial direction of the swingable shaft is made variably.

Further, according to the configuration, since a closed magnetic circuit is formed as a magnetic closed circuit regarding the magnetic flux generated by the exciting coil, it is possible to apply the magnetic field from the exciting coil to the magnetic viscoelastic elastomer efficiently, which can enhance the vibration isolation performance and power saving is provided.

(8) A still yet another invention may provide a method of producing the magnetic viscoelastic elastomer in the dynamic damper according to (3), comprising:

a process of arranging the exciting coil on an inner circumferential surface of the hollow circular cylinder of the first magnetic core;

a process of arranging the mass member and a second magnetic core on an inner circumferential surface of the exciting coil;

a process of arranging a first mold made of a non-magnetic material between the pillar and the exciting coil;

a process of arranging a second mold on an outer side in the axial direction of the first and second extending parts; and a process of pouring a material of the magnetic viscoelastic elastomer into a gap defined by the first and second molds and the first and second extending parts, the material including en elastic material such as rubber and magnetic particles in the elastic material.

According to this invention, it is possible to magnetize the magnetic viscoelastic elastomer only by attaching the first mold and the second mold to the components forming the active dynamic damper, so that the number of components for producing the dynamic damper can be reduced.

Advantageous Effect of Invention

According to the invention, the dynamic damper and the vibration isolator can be provided in which a physical property of the magnetic viscoelastic elastomer can be adjusted by applying a magnetic field to the magnetic viscoelastic elastomer efficiently.

BRIEF DESCRIPTION OF DRAWINGS

FIGS. 3A to 3C show various examples of the magnetic viscoelastic elastomers of the dynamic dampers according to the first embodiment of the present invention.

FIG. 4 is a general block diagram of a control system of the dynamic damper according to the first embodiment of the present invention.

FIG. 10A is an elevational cross section view of a vibration isolator according to the fifth embodiment of the present invention, FIG. 10B is an elevational cross section view of an example in which a liner bush is used for the vibration isolator, and FIG. 10C is an elevational cross section view of an example in which a rubber cover is used in the vibration isolator.

FIGS. 11A and 11B are elevational cross section views of other examples of the vibration isolators according to a fifth embodiment in which FIG. 11A and 11B show the examples which are different from each other.

MODES FOR CARRYING OUT INVENTION

A first embodiment of the present invention is described below in detail, referring to the attached drawings.

First Embodiment

Figure 1:
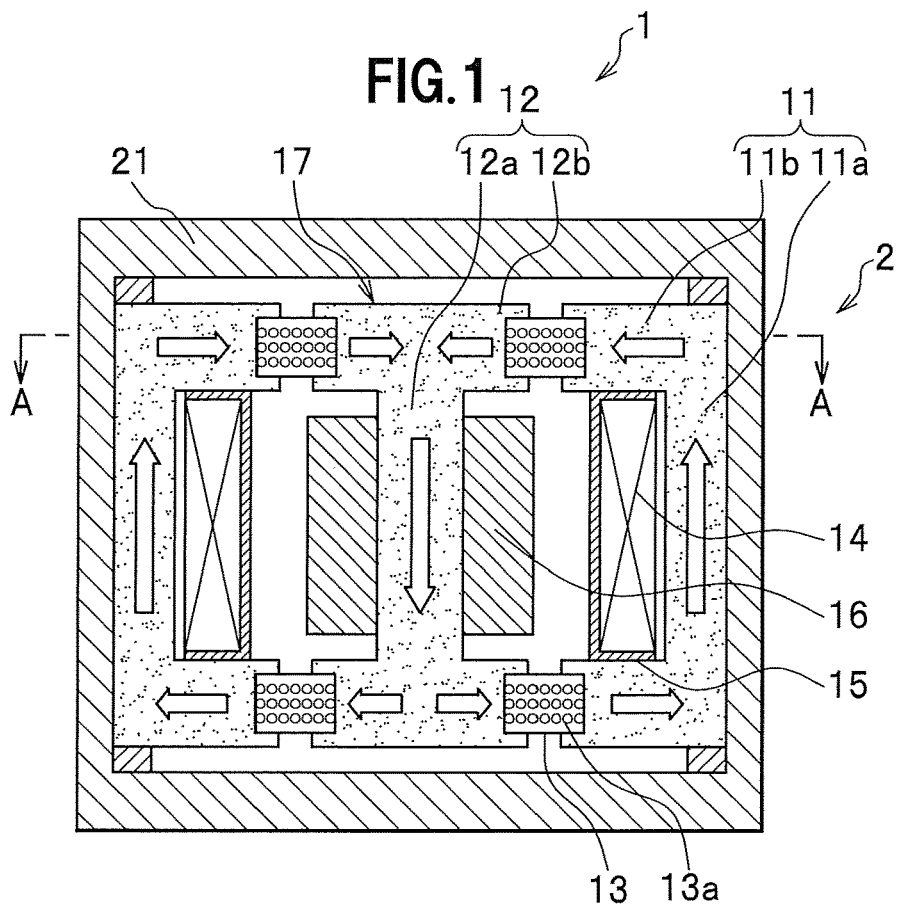
FIG. 1 is an elevational cross section view of a dynamic damper according to a first embodiment of the present invention.
Figure 2:
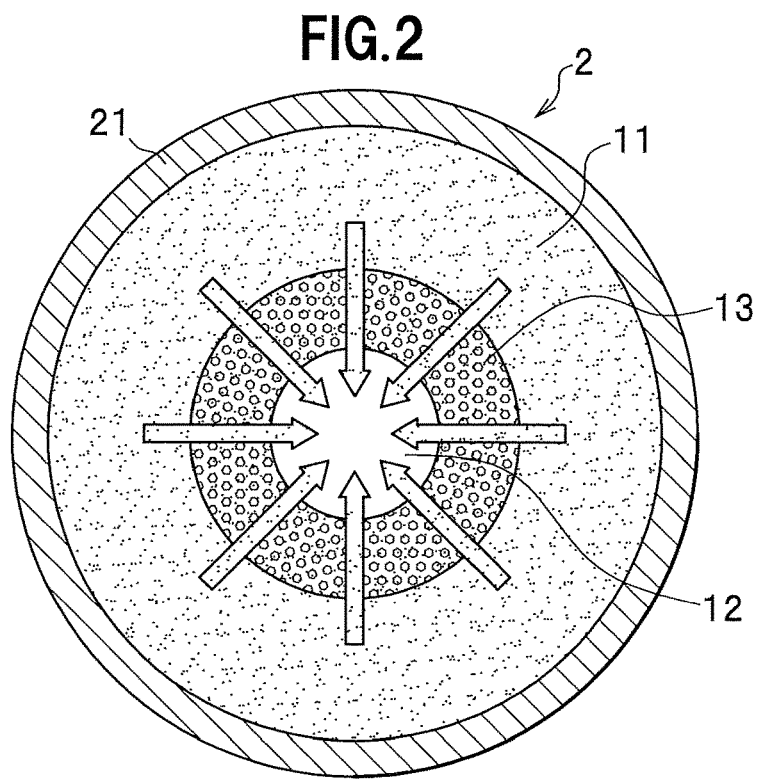
FIG. 2 is a cross section view, taken along line A-A in FIG. 1, of the dynamic damper according to the first embodiment of the present invention.

FIG. 1 is an elevational cross section view of a dynamic damper 2 according to the first embodiment of the present invention, and FIG. 2 is a cross section view of the dynamic damper 2, taken along a line A-A in FIG. 1.

The dynamic damper 2 includes a housing 21 made of a non-magnetic material with a hollow circular cylindrical shape. The housing 21 houses a movable member 17 which can move in response to an input force from the outside and a first magnetic core 11. The movable member 17 includes a second magnetic core 12, and an adjusting mass 16. Further, the housing 21 houses an exciting coil 14 for generating a magnetic field having intensity according to the current supplied thereto. The exciting coil 14 is made by winding a wire around a bobbin 15 having an annular shape.

The first magnetic core 11 and the second magnetic core 12 are a plurality of (two in this example) magnetic members forming a closed magnetic field path having an annular shape (indicated with blank arrows) through which the magnetic field generated by the exciting coil 14 transmits.

The second magnetic core 12 forms the movable part 17 and includes a pillar 12a extending in an axial direction of a hollow circular cylinder 11a and a second extending part 12b extending from the pillar 12a toward an outside of the circumferential direction of the pillar 12a.

The first magnetic core 11 includes the hollow circular cylinder 11a disposed between the housing 21 and the exciting coil 14, and an extending part 11b extending from the hollow circular cylinder 11a toward inside regarding a circumferential direction.

A magnetic viscoelastic elastomer (magnetic response-type elastic body (MRE)) 13 is arranged to form the closed magnetic circuit in which the first magnetic core 11 is connected to the second magnetic core 12 at least one part (two parts in this example). More specifically, the magnetic viscoelastic elastomer 13 is connected to the first magnetic core 11 and the second magnetic core 12 therebetween in a direction perpendicular to a movable direction of the movable part 17 (in a horizontal direction in FIG. 1). The magnetic viscoelastic elastomer 13 is disposed to be annular for connection between the inner end of the first extending part 11b and the outer end of the second extending part 12b.

In this example, when the exciting coil 14 is excited, as shown with the blank arrows, a magnetic flux transmits successively through a closed magnetic circuit starting from the hollow circular cylinder 11a via the extending part 11b, the magnetic viscoelastic elastomer 13, the second extending part 12b, on an upper side, the pillar 12a, and the second extending part 12b, and returning to the extending part 11b through the magnetic viscoelastic elastomer 13 on a lower side.

The magnetic viscoelastic elastomer 13 is a member of which viscoelastic property varies in accordance with an intensity of the magnetic field generated by the exciting coil 14. More specifically, the magnetic viscoelastic elastomer 13 comprises an elastic material such as a rubber, etc. to which magnetic particles 13a such as iron power are doped and has a property in which a stiffness becomes high when the magnetic field generated by the exciting coil 14 has a high intensity (described in detail later).

The adjusting mass 16 is provided on an outer circumference of the pillar 12a as a mass member which is non-magnetic material forming the movable part 17.

FIGS. 3A to 3C show various examples of the magnetic viscoelastic elastomer 13. A magnetic viscoelastic elastomer 13A shown in FIG. 3A is an example in which magnetic particles 13a are randomly dispersed in an elastic material such as a rubber. A magnetic viscoelastic elastomer 13B shown in FIG. 3B is an example in which the magnetic particles 13a are arranged to be directed to a center of the magnetic viscoelastic elastomer 13B having an annular shape. A magnetic viscoelastic elastomer 13C is an example in which the magnetic particles 13a are arranged in the same direction in each of four regions 13C1 to 13C4. An arrangement of the magnetic particles 13a in each of the regions 13C1 to 13C4 is directed to a center side of the magnetic viscoelastic elastomer 13C.

In the example shown in FIG. 1, the magnetic viscoelastic elastomer 13 has the arrangement of the magnetic particles 13a as shown in FIG. 3B. In the example shown in FIGS. 2A and 2B, the magnetic viscoelastic elastomer 13 has the arrangement of the magnetic particles 13a which are dispersed randomly as shown in FIG. 3A.

In the example shown in FIG. 3C, the magnetic viscoelastic elastomer 13C is formed with four parts. However, the magnetic viscoelastic elastomer 13C may be formed with separate parts or may be integrally formed.

In the examples, the magnetic viscoelastic elastomer 13B, the magnetic viscoelastic elastomer 13C shown in FIG. 3C has arrangement direction which is perpendicular to a moving direction of the movable member 17 (horizontal direction in FIG. 1).

FIG. 4 is a general block diagram of a control system 50 of the dynamic damper 2. A table 51 is used to obtain a drive current value according to a rotation speed of a rotating machine Ml, for example, an engine in a vehicle. A power driver 52 configured including semiconductor switching elements, etc. applies the drive current to the exciting coil 14. Accordingly, the exciting coil 14 is excited with a drive current according to the rotation speed of the rotating machine Ml. As a result, the magnetic field generated by the exciting coil 14 is changed in accordance with the rotation speed of the rotating machine Ml, which changes a stiffness of the magnetic viscoelastic elastomer 13 of the movable member 17 (mass M), so that a spring constant (K) of the movable member 17 is changed.

Next, an operation of the dynamic damper 2 is described below.

In the dynamic damper 2, when the magnetic viscoelastic elastomer 13 vibrates in vertical direction in FIG. 1 due to generation of vibrations, a shearing force is applied to the magnetic viscoelastic elastomer 13 in the vertical direction in FIG. 1 due to the vibration generation, so that an arrangement of the magnetic particles 13 deviated. In this state, when a magnetic field is applied thereto with the exciting coil 14, the magnetic particles 13a tend to line in the direction of the magnetic field. This resists an external force, so that the apparent stiffness of the magnetic viscoelastic elastomer 13 increases. The variation of the stiffness of the magnetic viscoelastic elastomer 13 varies a resonance frequency of the movable part 17, which changes a frequency of damping the vibrations. Because the variation in the stiffness in this case varies in accordance with the rotational speed of the engine, etc. of the vehicle as shown in the table 51, the vibrations can be suppressed efficiently in accordance with variation in the rotational speed of the engine, etc. of the vehicle.

Figure 5:
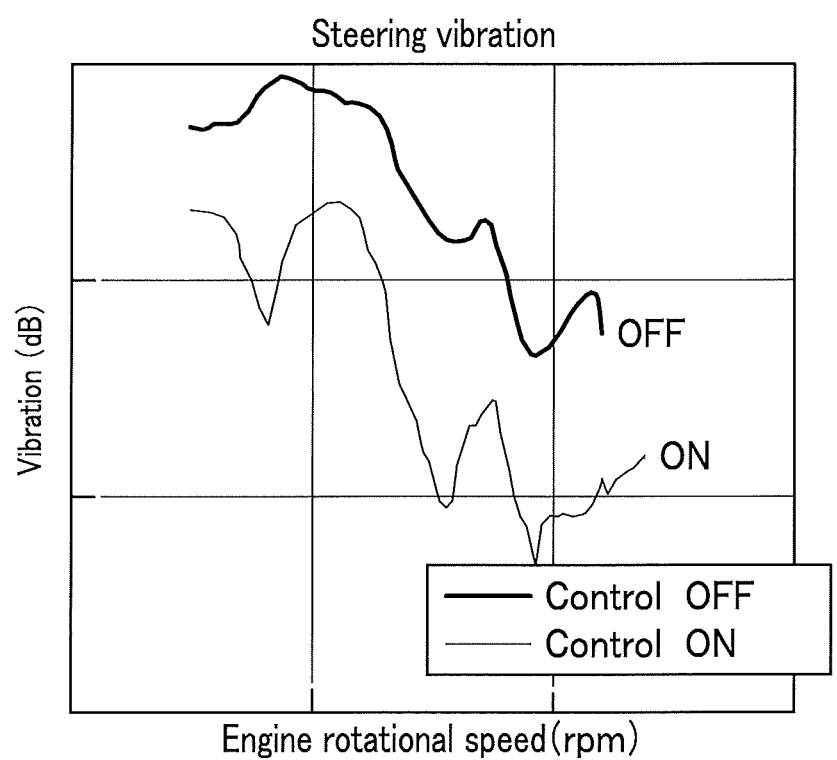
FIG. 5 is a chart showing an operation of the dynamic damper according to the first embodiment of the present invention.

FIG. 5 is a chart showing a difference in extent how much the vibration of the engine is transmitted to the steering wheel of the vehicle regarding the rotation speed of the engine of the vehicle between a case where the dynamic damper 2 is turned off (Control OFF) and a case where the dynamic damper 2 is turned on (Control ON). This is an example of control effect regarding the steering wheel vibration in the case where the dynamic damper 2 is disposed in the vicinity of an engine mounting point and the vibration is reduced in accordance with the rotation speed of the engine. From the result of the curves in the chart, it can be understood that the vibrations can be suppressed more efficiently in the case where the dynamic damper 2 is turned on by suppressing the vibration in accordance with the rotation speed of the engine of the vehicle (Control ON) than the case where the dynamic damper 2 is turned off (Control OFF).

In the dynamic damper 2 according to the embodiment, a closed magnetic circuit including the first magnetic core 11 and the second magnetic core 12 are connected with the magnetic viscoelastic elastomer 13 to form the closed magnetic circuit for the exciting coil 14 in the housing 21 which is a non-magnetic material, in other words, the magnetic viscoelastic elastomer 13 can be disposed in the closed magnetic circuit. This provides efficient magnetic field application from the exciting coil 14 to the magnetic viscoelastic elastomer 13. Accordingly, this enhances the vibration isolating performance of the dynamic damper 2 and provides power saving.

In the examples of the magnetic viscoelastic elastomer 13B shown in FIG. 3B and the magnetic viscoelastic elastomer 13C shown in FIG. 3C, the magnetic particles 13a are arranged in a direction perpendicular to the movable direction (vertical direction in FIG. 1). Accordingly, depending on the magnetic flux quantity in the closed magnetic circuit formed by the first magnetic core 11 and the second magnetic core 12, a bonding force between the magnetic particles 13a is changed, so that a variable range of a stiffness of the magnetic viscoelastic elastomer 13 with respect to an input force in the movable direction of the movable member 17 can be set to be large, improving the vibration isolating performance of the dynamic damper 2.

Further, this provides the dynamic damper 2 in which the magnetic viscoelastic elastomer 13 is disposed in the closed magnetic circuit, so that the vibration isolating performance can be improved.

Further, this configuration can move the second magnetic core 12 as a mass in addition to the adjusting mass 16, which can provide the weight-saving and down-sizing.

Regarding this, the dynamic damper 2 is essentially configured as one-degree-of-freedom system including an elastic element, a mass element, and a damping element which are passive elements having fixed characteristic in which various types of physical properties are adjusted to perform the vibration isolating performance most efficiently by matching an eigenvalue to a frequency of disturbance vibrations, which is a target of vibration isolation, to provide the highest vibration isolating efficient. In the embodiment, the elastic element is focused among these physical properties and it is possible to automatically adjust the eigenvalue by making the elastic modulus variable in accordance with an external signal, so that a state in which the vibration isolating efficient is highest can be maintained in accordance with variation in the frequency of the target of vibration isolation.

Further, since a physical property of the material of the magnetic viscoelastic elastomer 13 varies itself, it is possible for the magnetic viscoelastic elastomer 13 to be easily replaced with an existent passive spring element and can be formed in a given shape, so that a degree of freedom is large when the magnetic viscoelastic elastomer 13 is installed as the spring element, which results in that there is no restriction in installation of the magnetic viscoelastic elastomer 13. Accordingly, the vibration isolator can be configured without a large increase in the dimensions of the whole unit as compared with the existent vibration isolating device. Further, this is advantageous because responsiveness to the physical property variation caused by application of the magnetic field to the magnetic viscoelastic elastomer 13 is several milliseconds, which is very excellent.

Second Embodiment

Only different points from the first embodiment are mainly described below. The same parts and same elements are designated with the same or corresponding reference, and a detailed description about this is omitted.

Figure 6A:
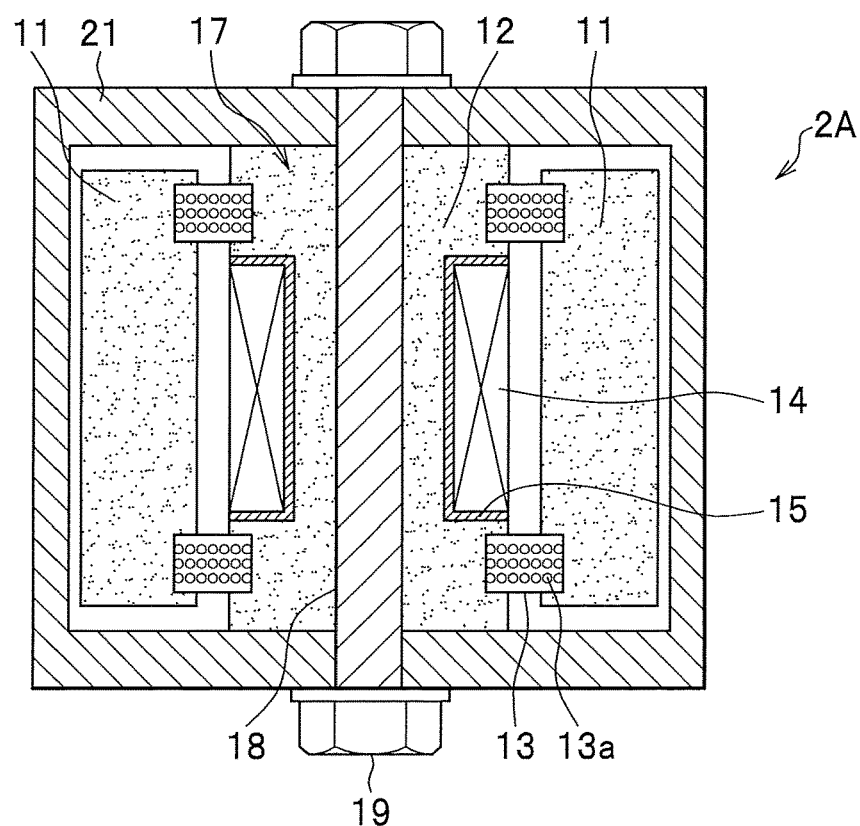
FIGS. 6A and 6B are elevational cross section views of the dynamic damper according to the second embodiment.
Figure 6B:
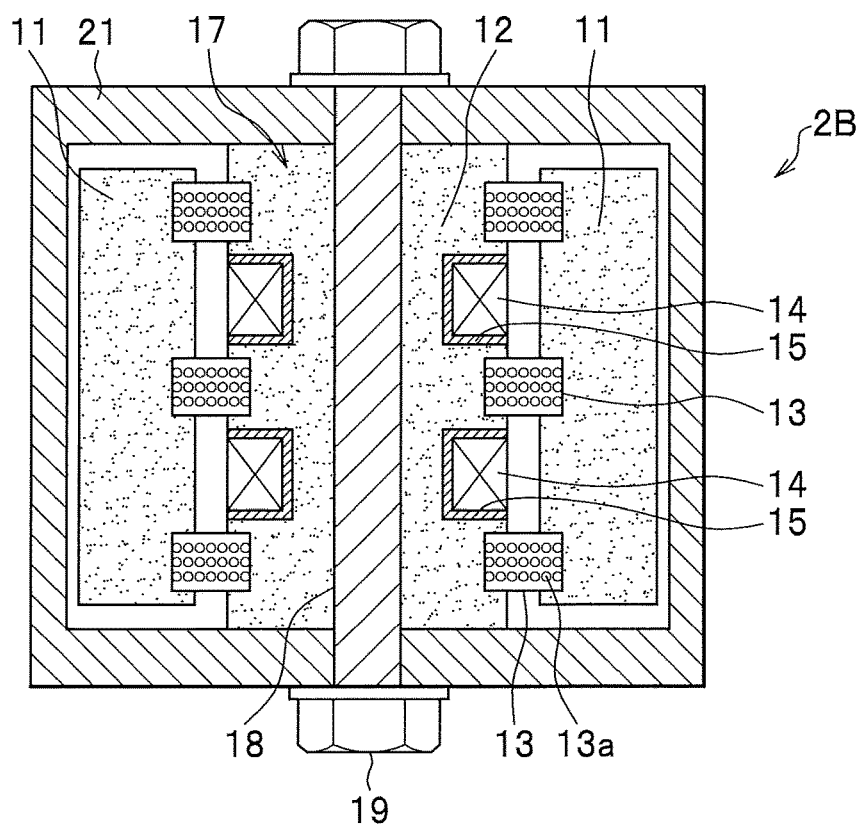

FIGS. 6A and 6B are elevational cross section views of a dynamic damper 2A according to the second embodiment.

The difference in the dynamic damper 2A shown in FIG. 6A from the dynamic damper 2 according to the first embodiment is in that the second magnetic core 12 does not move relative to the housing 21 because the second magnetic core 12 is penetrated by a shaft 18 which also penetrates upper and lower walls of the housing 2 to be fixed to the housing 21. Further, the first magnetic core 11 disposed around the second magnetic core 12 and can move inside the housing 21 in which the first magnetic core 11 serves as the mass element. In addition, the exciting coil 14 is mounted on the second magnetic core 12.

This can increase a mass of the first magnetic core 11, which serves as the movable member in the dynamic damper 2A.

FIG. 6B shows a modification of the dynamic damper 2A in which the exciting coil 14 is separated into two parts, i.e., upper and lower exciting coils. The magnetic viscoelastic elastomers 13 are further provided between the upper and lower exciting coils.

Third Embodiment

Figure 7:
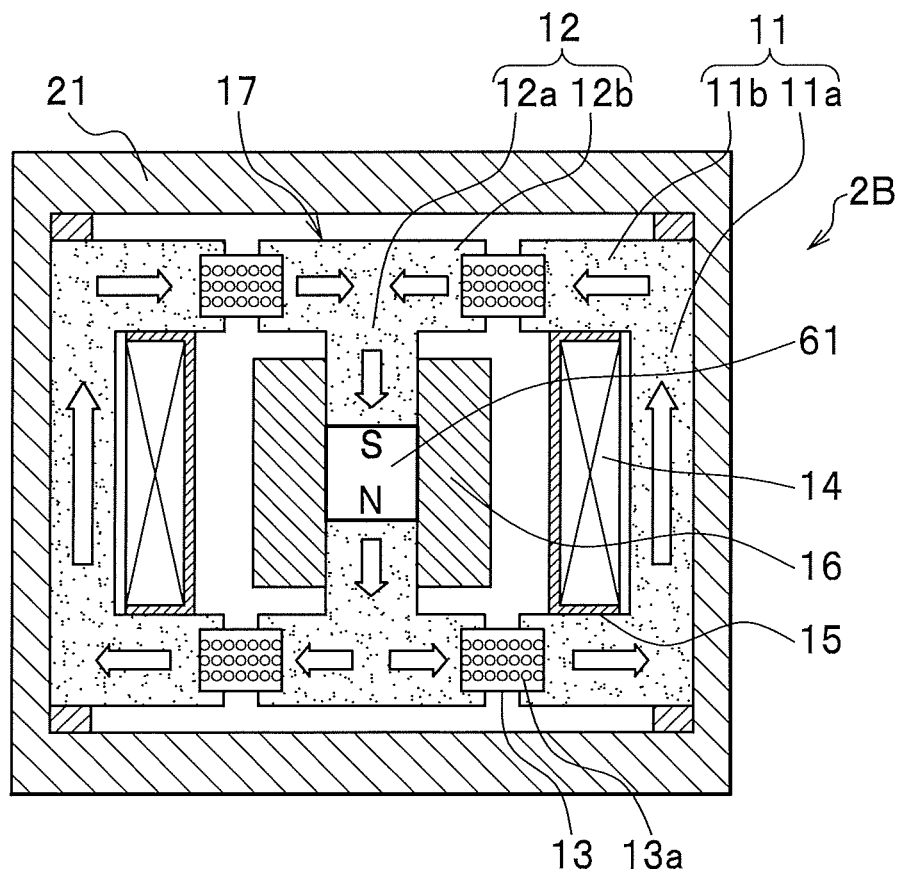
FIG. 7 is an elevational cross section view of a dynamic damper according to a third embodiment.

FIG. 7 is an elevational cross section view of a dynamic damper 2B according to a third embodiment.

The difference in the dynamic damper 2B shown in FIG. 7 from the dynamic damper 2 according to the first embodiment is in that a permanent magnet 61 is further provided which forms a magnetic path in parallel to the magnetic path (shown by blank arrows in FIG. 7) formed by the first magnetic core 11 as a result of magnetic field from the exciting coil 14, and in that the permanent magnet 61 is housed by the adjusting mass 16 which is a non-magnetic mass member.

Because the permanent magnet 61 is inserted in a closed magnetic circuit, it is possible to previously apply a bias magnetic field to the magnetic viscoelastic elastomer 13 though the exciting coil 14 is not excited.

Figure 8:
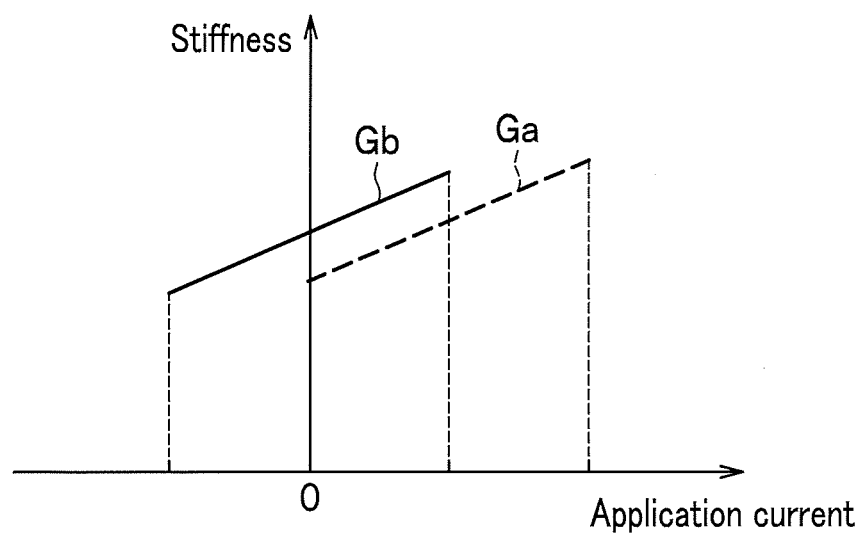
FIG. 8 is a chart showing an operation of the dynamic damper according to the third embodiment.

FIG. 8 is a chart showing a relation between an application current to the exciting coil 14 and a stiffness of the magnetic viscoelastic elastomer 13. A stiffness Ga shows the stiffness characteristic according to the first embodiment and a stiffness Gb shows the stiffness characteristic according to the third embodiment. When an exciting current is 0 A, the stiffness Ga according to the first embodiment has the lowest value (an inherent value of the magnetic viscoelastic elastomer 13 when the exciting coil 14 is not excited). When the exciting current is maximum, the stiffness Ga has a maximum value. On the other hand, the stiffness Ga according to the third embodiment is lower than that in the first embodiment regarding both the lowest value and the highest value because the applied exciting current is lower than that in the first embodiment.

Accordingly, a power consumption can be suppressed because the elastic modulus of the magnetic viscoelastic elastomer 13 can be kept to a reference elastic modulus by allowing the exciting current to be zero.

Further, the elastic modulus of the magnetic viscoelastic elastomer 13 can be easily controlled by increasing or decreasing the elastic modulus of the magnetic viscoelastic elastomer 13 relative to the reference stiffness by increasing and decreasing the magnetic force applied to the magnetic viscoelastic elastomer 13, which provides easy adjusting the elastic modulus of the magnetic viscoelastic elastomer 13.

Fourth Embodiment

Figure 9:
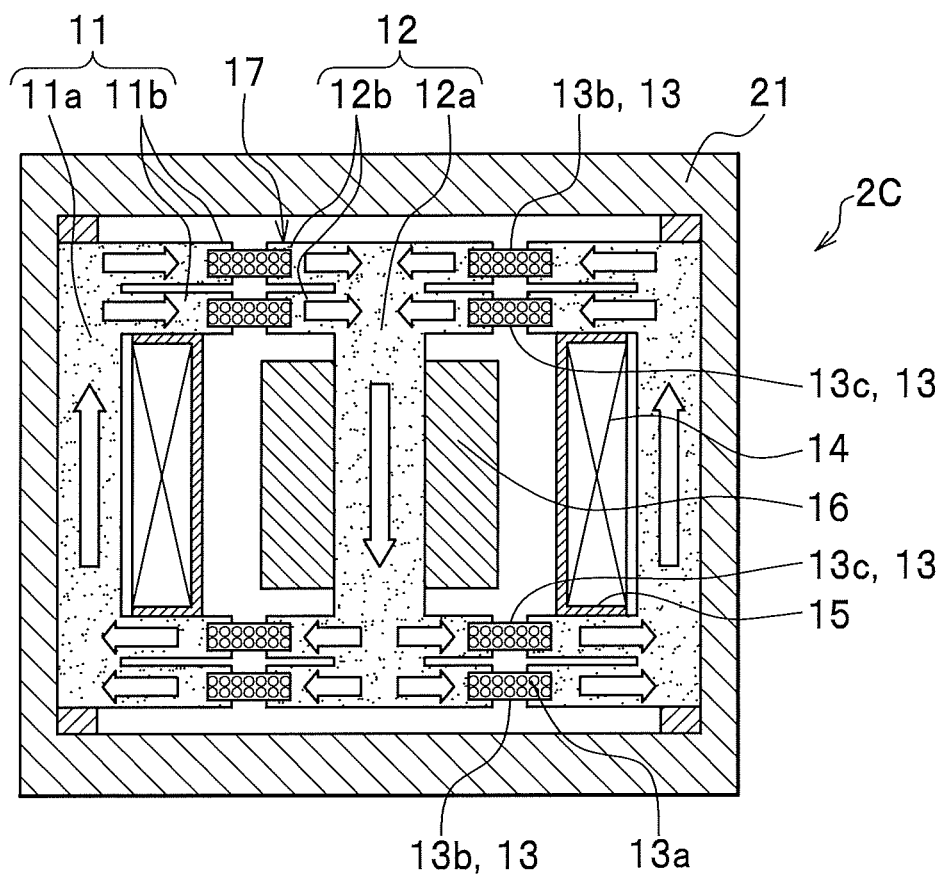
FIG. 9 is an elevational cross section view of a dynamic damper according to a fourth embodiment.

FIG. 9 is an elevational cross section view of a dynamic damper 2C according to a fourth embodiment.

The difference in the dynamic damper 2C shown in FIG. 9 from the dynamic damper 2 according to the first embodiment is in that a configuration including first and second extending parts 11b, 12b and the magnetic viscoelastic elastomer 13 have a plurality of layers (two layers in the examples in FIG. 9) at upper and lower positions in axial direction of the first and second magnetic cores 11 12, respectively. In addition, in the layer including a magnetic viscoelastic elastomer 13b disposed on axially outer side of the first magnetic core 11 and the second magnetic core 12 out of a plurality of the layers (two layers), the magnetic viscoelastic elastomer 13b has a thickness thinner than that of a magnetic viscoelastic elastomer 13c disposed on an axially inner side, is elongated in a circumferential direction, or includes the magnetic particles 13a of which quantity is reduced.

When a plurality of layers of closed magnetic circuits are disposed using the magnetic viscoelastic elastomers 13, a magnetic flux density becomes higher as a position more shifts on an axially outer side of the first magnetic core 11 and the second magnetic core 12 and becomes lower as the position more shifts on an axially inner side of the first magnetic core 11 and the second magnetic core 12.

When each of the layers has the same configuration, the magnetic viscoelastic elastomer 13 at the outside layer has stiffness higher than that of the magnetic viscoelastic elastomer 13 at the inside layer, so that the movable member 17 substantially operates in accordance with the stiffness of the magnetic viscoelastic elastomer 13 of the outside layer. This does not provide an efficient stiffness change.

Accordingly, each of the layers has the above-described configuration, which equalizes the stiffness of the magnetic viscoelastic elastomers 13 disposed outside and insides, which provides an efficient stiffness change.

In addition, a plurality of layers contributes to fail safe.

Fifth Embodiment

In a fifth embodiment, an example in which the dynamic damper 2 is used as a vibration isolator is described below.

FIG. 10A is an elevational cross section view of a vibration isolator 1 according to the fifth embodiment of the present invention.

The vibration isolator 1 shown in FIG. 10A is different in that the movable member 17 includes a shaft 31 protrudes on an axially outer side of the pillar 12a from a top board 21a of the housing 21 penetrating through a through hole 21b across the top board 21a and has an end connected to a vibration isolating target (not shown). The shaft 31 penetrates a center part of the second magnetic core 12 such that a longitudinal direction of the shaft 31 coincides with a longitudinal direction of the second magnetic core 12 and is fixed to from a lower end to the upper end of the second magnetic core 12.

The vibration isolator 1 is connected at one end of the shaft 31 to the vibration isolation target, and the housing 21 is fixed to a predetermined member. This causes the dynamic damper 2 to function as the vibration isolator 1. The vibration isolator 1 has usage, such as a torque rod for the vehicle to be used to isolate the vibrations from the vehicle.

As a supporting device for supporting the shaft 31 relative to the housing 21, a linear bush 71 intervenes between an inner circumferential surface of the through hole 21b and an outer circumferential surface of the shaft 31 as shown in FIG. 10A. In this case, a moving direction of the shaft 31 can be restricted only to an axial direction of the shaft 31.

Further, a rubber cover 72 intervenes the outer circumferential surface of the shaft 31 and the inner circumferential surface of the through hole 21b as shown in FIG. 10C. In this case, the moving direction of the shaft 31 is allowed in a diametrical direction of the shaft 31 in addition to the axial direction of the shaft 31 to be adapted to a twisting motion of the shaft 31.

FIG. 11 shows an example in which the example in FIG. 10 is modified to protrude from a bottom plate 21c through a through hole 21d across the bottom plate 21c toward axially outer side to the pillar 12a. In the example shown in FIG. 11A restricts the moving direction of the shaft 31 to the axial direction of the shaft 31 using the linear bush 71 as similar to the example in FIG. 10A. In the example shown in FIG. 11B is adapted to the twisting motion of the shaft 31 using the rubber cover 72 as similar to FIG. 10C.

According to this configuration, the vibration isolator 1 in which the magnetic viscoelastic elastomer 13 is disposed in the closed magnetic circuit, which improves the vibration isolation performance of the vibration isolator 1.

Sixth Embodiment

In the sixth embodiment, a vibration isolator to which the dynamic damper 2 is applied is described below.

Figure 12:
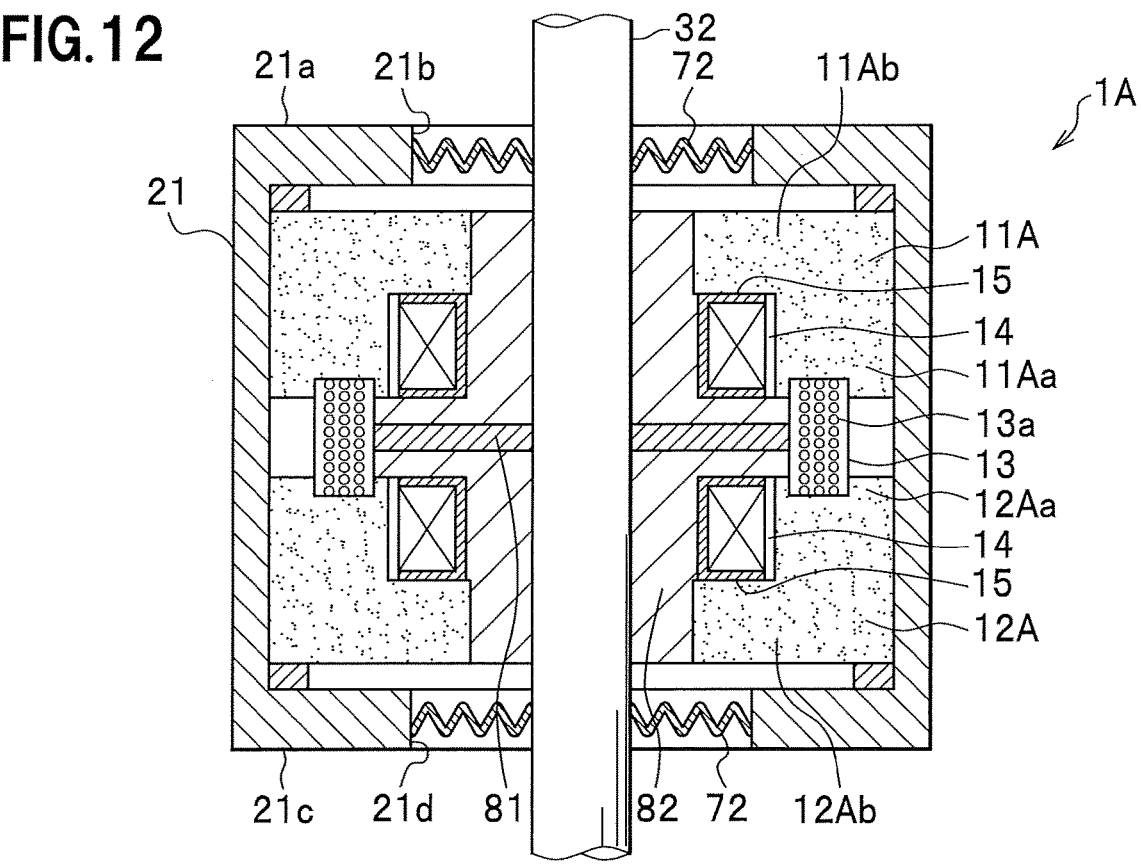
FIG. 12 is an elevational cross section view of a vibration isolator according to a sixth embodiment of the present invention.

FIG. 12 is an elevational cross section view of a vibration isolator 1A according to the sixth embodiment of the present invention.

The vibration isolator 1A includes the housing 21 made of a non-magnetic member having a hollow circular cylindrical housing 21 and a swing shaft 32 of which at least one end is fixed to an outside member. More specifically, a one end of the swing shaft 32 protrudes from the top board 21a, penetrating the top board 21a through the through hole 21b across the top board 21a to an outside, and another end protrudes from the bottom plate 21c, penetrating the bottom plate 21c through the through hole 21d across the bottom plate 21c to an outside. Further, the rubber cover 72 intervenes between the inner circumferential surfaces of the through holes 21b, 21d to swingably support the swing shaft 32 relative to the housing 21.

The magnetic viscoelastic elastomer 13 has an annular shape and is disposed to be elastically deformed in response to an input from the swing shaft 32, and the magnetic particles 13a is included in the inside of the elastic member such as a rubber, so that an elastic modulus can be changed in accordance with an applied magnetic force.

The exciting coil 14, which is provided by winding a wire around the bobbin 15 is disposed inside the housing 21, applies the magnetic force to the magnetic viscoelastic elastomer 13.

Between the housing 21 and the exciting coil 14, there are at least two magnetic cores to form a magnetic circuit through the magnetic viscoelastic elastomer 13.

Magnetic cores 11A, 12A includes: hollow circular cylinders 11Ab and 12Ab disposed at outer circumferential areas of the swing shaft 32; and extending parts 11Ab and 12Ab extending from ends on axially outer sides of the hollow circular cylinders 11Aa, 12Aa toward the axis of the hollow circular cylinders 11Aa, 12Aa, respectively.

The magnetic viscoelastic elastomer 13 has a hollow circular cylindrical shape to connect ends on axially inner sides of the two magnetic cores 11A, 12A with the magnetic viscoelastic elastomer 13.

A transmission part 81 extends from the swing shaft 32 in a direction perpendicular to the axial direction to abut inner circumferential surface of the magnetic viscoelastic elastomer 13 to transmit displacement of the swing shaft 32 to the magnetic viscoelastic elastomer 13 relative to the housing 21. An elastic material 82 is filled in a space inside inner circumferential surfaces of the magnetic cores 11A, 12A, the exciting coil 14, and the second magnetic core 12 and outside outer circumferential surfaces of the swing shaft 32 and the transmission part 81.

According to this configuration, when an input force is applied to the housing 21 or the swing shaft 32 and the swing shaft 32 is displaced relative to the housing 21, a load caused by the displacement of the swing shaft 32 can be transmitted to the magnetic viscoelastic elastomer 13 through the transmission part 81.

According to this configuration, the stiffness of the magnetic viscoelastic elastomer 13 can be changed, which enables variable vibration isolation against the input force to the swing shaft 32 in the direction perpendicular to the axial direction.

According to the above-described configuration, a closed magnetic circuit is formed from magnetic flux generated by the exciting coil 14 between the magnetic cores 11A, 12A and the magnetic viscoelastic elastomer 13, so that it is possible to apply the magnetic field from the exciting coil 14 to the magnetic viscoelastic elastomer 13 efficiently, which enhances a vibration isolation performance and provides power saving.

Seventh Embodiment

Figure 13:
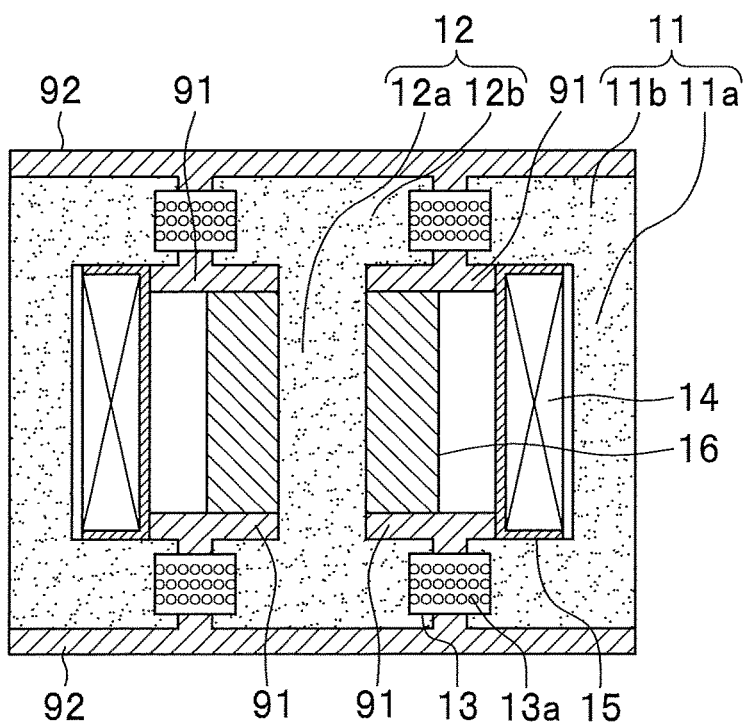
FIG. 13 shows an elevational cross section view to show a method of producing the magnetic viscoelastic elastomer according to the seventh embodiment of the present invention.

FIG. 13 shows a cross sectional view according to a seventh embodiment to show a method of producing the magnetic viscoelastic elastomer according to the seventh embodiment of the present invention.

The seventh embodiment shows the method of producing the magnetic viscoelastic elastomer. The method of producing the magnetic viscoelastic elastomer is described in which the magnetic viscoelastic elastomer 13 in the dynamic damper 2 according to the first embodiment shown in FIGS. 1 and 2 is exemplified.

The method of producing the magnetic viscoelastic elastomer 13 is performed through the below processes successively.

First Process

The exciting coil 14 is disposed inside an inner circumferential surface of a hollow circular cylinder 11a of the first magnetic core 11, the exciting coil 14 being produced by winding a wire around the bobbin 15.

Second Process

The adjusting mass 16 and the second magnetic core 12, serving as a mass member, inside an inner circumferential surface of the exciting coil 14.

Third Process

A first mold 91 is disposed between the pillar 12a of the second magnetic core 12 and the exciting coil 14, the first mold 91 having, for example, a plate shape, and being made of a non-magnetic material. This operation is performed such that the first mold 91 abuts the first extending part 11b and a second extending part 12b.

Fourth Process

A second mold 92 having, for example, a plate shape, is disposed axially outer sides of the first extending part 11b and the second extending part 12b.

Fifth Process

A material of the magnetic viscoelastic elastomer 13 is poured into a gap defined by the first mold 91, the second mold 92, the first extending part 11b, the second extending part 12b, the material includes the magnetic particles 13a in the elastic material such as rubber.

Sixth Process

The magnetic viscoelastic elastomer 13 is magnetized by applying a current through the exciting coil 14.

When the material of the magnetic viscoelastic elastomer 13 is hardened through the above-described processes, the movable member 17 has been formed (see FIG. 1). After this, the first mold 91 and the second mold 92 are removed, and the movable member 17 is put into the housing 21 (see FIG. 1), so that the dynamic damper 2 is produced.

According to the above-describe configuration, it is possible to magnetize the magnetic viscoelastic elastomer 13 only by attaching the first mold 91 and the second mold 92 to the parts forming the active dynamic damper, which can reduce the number of components necessary for producing the dynamic damper 2.

Application Examples

Figure 14A:
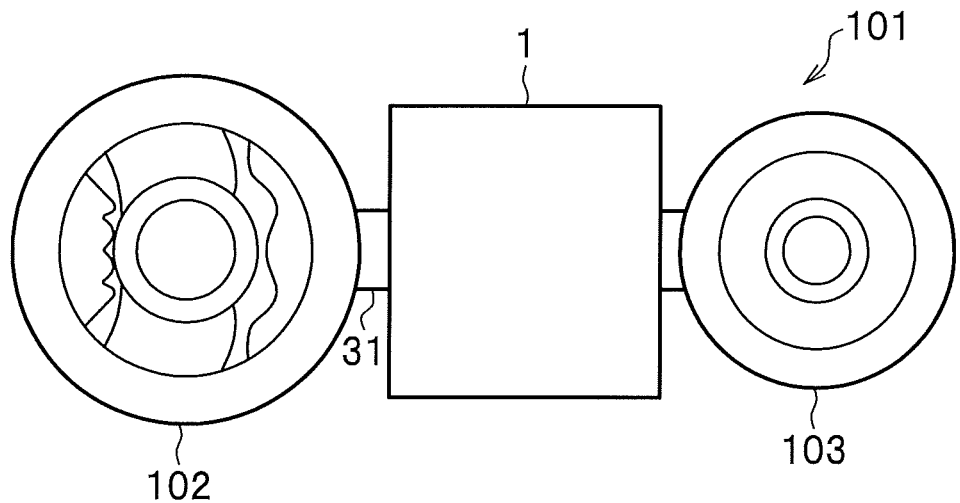
FIG. 14A is an illustration illustrating an example in which the vibration isolator according to the fifth embodiment is applied to a torque rod.

Next, an example is shown in which the vibration isolator 1 shown in FIG. 11A is applied to a torque rod. A torque rod 101 includes, as shown in FIG. 14A, a pair of a first insulator 103, a second insulator 102, and a vibration isolator 1 shown in FIG. 11A.

The first insulator 103 is mounted on a side of an engine of a vehicle. On the other hand, the second insulator 102, having a diameter which is greater than that of the first insulator 103, is mounted on a side of the vehicle.

Figure 14B:
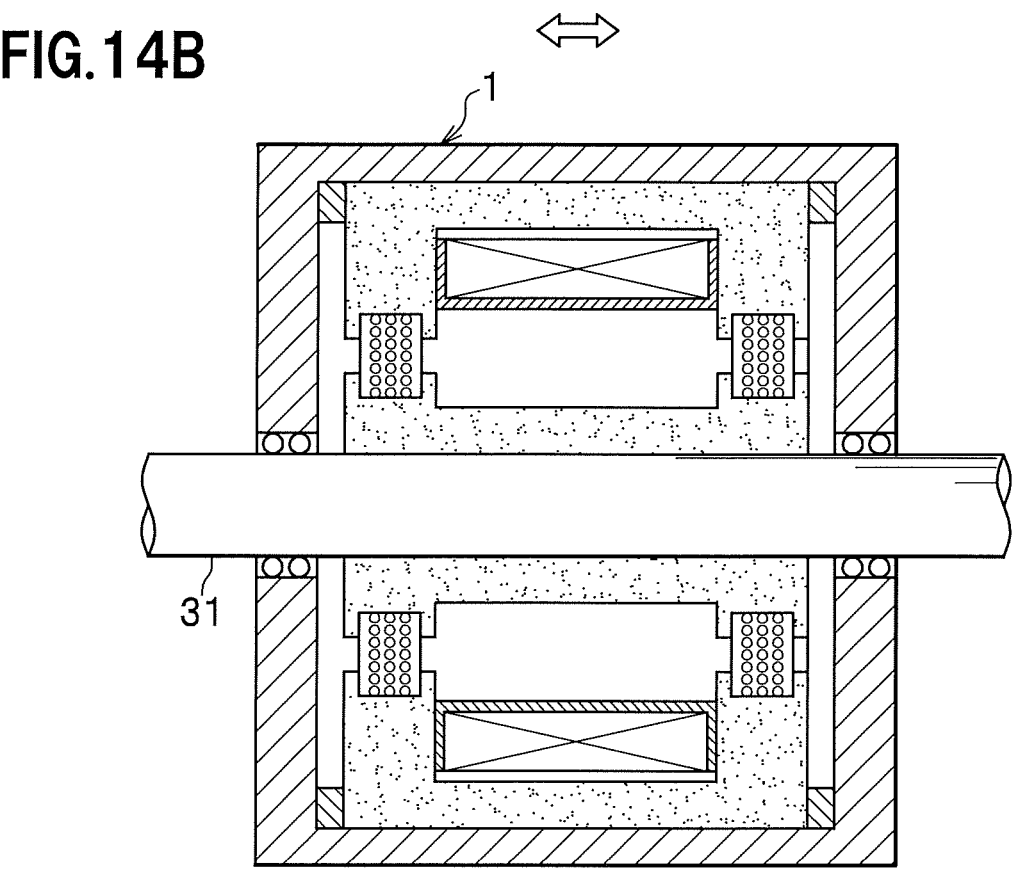
FIG. 14B is an elevational cross section view of the vibration isolator according to the fifth embodiment, which is applied to the torque rod.

The vibration isolator 1 has the configuration described above referring to FIG. 11A, etc. Both ends of the shaft 31 are fixed to the first insulators 103, 102, so that vibrations in a direction shown by arrows, shown in FIG. 14B.

The present invention is applicable not only to vehicles including engines but also to all types of vehicles such as electric cars and fuel cell vehicles.

Further, the present invention is applicable to such a state that an operator holds steering wheel of a ship while the ship is laterally flowed by a tidal stream or lateral wind (in a case of single-flow in ships (small ships), etc.

DESCRIPTION OF REFERENCE SYMBOLS 1 vibration isolator
2 dynamic damper
11 first magnetic core (magnetic member)
11a hollow circular cylinder
11b first extending part
11A magnetic core
11Aa hollow circular cylinder
1Ab extending part
12 second magnetic core (magnetic member)
12a pillar
12b second extending part
12A magnetic core
12Aa hollow circular cylinder
12Ab extending part
13 (13A, 13B, 13C) magnetic viscoelastic elastomer
14 exciting coil
16 adjusting mass (mass member)
17 movable member
21 housing
31 shaft
32 swing shaft
61 permanent magnet
81 transmission part

The invention claimed is:

1. A dynamic damper comprising:
a housing made of non-magnetic material;
a movable part movable in response to an external input force;
an exciting coil that generates a magnetic field having an intensity corresponding to a current supplied thereto;
a magnetic viscoelastic elastomer having a magnetic viscoelastic property controlled in accordance with a magnitude of magnetic field generated by the exciting coil;
a plurality of magnetic members forming a magnetic path transmitting the magnetic field generated by the exciting coil as an annular closed magnetic circuit,
wherein the movable part includes at least one of the plurality of the magnetic members; and
wherein the magnetic viscoelastic elastomer is disposed to form the closed magnetic circuit by connecting one of the magnetic members forming the movable part to another one of the magnetic members to transmit the magnetic field in a one-way direction inside the magnetic viscoelastic elastomer in accordance with a direction of the magnetic field generated by the exciting coil.

2. The dynamic damper as claimed in claim 1, wherein the plurality of the magnetic members comprise a first magnetic core and a second magnetic core that form the movable part;

wherein the magnetic viscoelastic elastomer is connected between the first magnetic core and the second magnetic core in a direction perpendicular to a movable direction; and wherein the magnetic viscoelastic elastomer includes magnetic particles which are arranged in the direction perpendicular to the movable direction.

3. The dynamic damper as claimed in 1, wherein the one of the magnetic members and the another one of the magnetic members have first and second ends which are provided with first and second extending parts extending in facing directions therebetween, respectively.

4. The dynamic damper as claimed in 1, wherein the housing supports either one of the one of the magnetic members forming the movable part or the another one of the magnetic members.

5. The dynamic damper as claimed in 4, wherein the housing provides no additional magnetic path.

6. A dynamic damper comprising:
a housing made of non-magnetic material;
a movable part movable in response to an external input force;
an exciting coil that generates a magnetic field having an intensity corresponding to a current supplied thereto;
a magnetic viscoelastic elastomer having a magnetic viscoelastic property controlled in accordance with a magnitude of magnetic field generated by the exciting coil; and
a plurality of magnetic members forming a magnetic path transmitting the magnetic field generated by the exciting coil as an annular closed magnetic circuit,
wherein the movable part includes at least one of the plurality of magnetic members;
wherein the magnetic viscoelastic elastomer is disposed to form the closed magnetic circuit by connecting one of the magnetic members forming the movable part to another one of the magnetic members,
wherein the plurality of magnetic members comprise a first magnetic core and a second magnetic core that forms the movable part;
wherein the magnetic viscoelastic elastomer is connected between the first magnetic core and the second magnetic core in a direction perpendicular to a movable direction of the movable part;
wherein the magnetic viscoelastic elastomer includes magnetic particles which are arranged in the direction perpendicular to the movable direction,
wherein the first magnetic core includes;
a hollow circular cylinder disposed between the housing and the exciting coil, and
a first extending part extending from the hollow circular cylinder toward an inside of a circumferential direction;
wherein the second magnetic core includes:
a pillar extending in an axial direction of the hollow circular cylinder; and
a second extending part extending outwardly in a circumferential direction from the pillar,
wherein the magnetic viscoelastic elastomer has an annular shape to connect an inner end of the first extending part and an outer end of the second extending part;
wherein the movable part includes:
the second magnetic core; and
a mass member made of a non-magnetic material connected to an outer circumferential surface of the pillar, and wherein the dynamic damper is an active dynamic damper that adjusts a vibration state of the movable part in accordance with a stiffness of the magnetic viscoelastic elastomer.

7. The dynamic damper as claimed in claim 6, further comprising a permanent magnet that is disposed in the second magnetic core and forms the magnetic path in parallel to the magnetic path formed in the first magnetic core by the magnetic field applied by the exciting coil, wherein the permanent magnet is enclosed by the mass member made of the non-magnetic material.

8. The dynamic damper as claimed in claim 6,
wherein the first extending part, the second extending part, and the magnetic viscoelastic elastomer form a structure, the dynamic damper comprises a plurality of the structure arranged in an axial direction of the first and second magnetic cores,
wherein out of the plurality of the structure, the magnetic viscoelastic elastomer in one structure disposed on an outer side in the axial direction is made thinner in the axial direction, longer in the circumferential direction, or to include less magnetic particles, than the magnetic viscoelastic elastomer in another structure disposed on an inside in the axial direction.

9. A method of producing the magnetic viscoelastic elastomer in the dynamic damper as claimed in claim 6, comprising:
a process of arranging the exciting coil on an inner circumference of the hollow circular cylinder of the first magnetic core;
a process of arranging the mass member and the second magnetic core on an inner circumference of the exciting coil;
a process of arranging a first mold made of a non-magnetic material between the pillar and the exciting coil;
a process of arranging a second mold on an outer side in the axial direction of the first and second extending parts;
a process of pouring a material of the magnetic viscoelastic elastomer into a gap defined by the first and second molds and the first and second extending parts, the material including an elastic material and magnetic particles in the elastic material; and
a process of applying an electric power to the exciting coil to magnetize the magnetic viscoelastic elastomer.

10. A vibration isolator comprising:
an active damper and a shaft,
wherein the active damper comprises:
a housing made of non-magnetic material;
a movable part movable in response to an external input force;
an exciting coil that generates a magnetic field having an intensity corresponding to a current supplied thereto;
a magnetic viscoelastic elastomer having a magnetic viscoelastic property controlled in accordance with a magnitude of magnetic field generated by the exciting coil; and
a plurality of magnetic members forming a magnetic path transmitting the magnetic field generated by the exciting coil as an annular closed magnetic circuit,
wherein the movable part includes at least one of the plurality of magnetic members;
wherein the magnetic viscoelastic elastomer is disposed to form the closed magnetic circuit by connecting one of the magnetic members forming the movable part to another one of the magnetic members, wherein the plurality of magnetic members comprise a first magnetic core and a second magnetic core that forms the movable part;
wherein the magnetic viscoelastic elastomer is connected between the first magnetic core and the second magnetic core in a direction perpendicular to a movable direction of the movable part;
wherein the magnetic viscoelastic elastomer includes magnetic particles which are arranged in the direction perpendicular to the movable direction,
wherein the active dynamic damper adjusts a vibration state of the movable part in accordance with a stiffness of the magnetic viscoelastic elastomer,
wherein the first magnetic core comprises:
   a hollow circular cylinder disposed between the housing and the exciting coil, and
   a first extending part extending from the hollow circular cylinder toward an inside of a circumferential direction;
wherein the second magnetic core includes:
   a pillar extending in an axial direction of the hollow circular cylinder; and
   a second extending part extending outwardly in a circumferential direction from the pillar,
wherein the magnetic viscoelastic elastomer has an annular shape to connect an inner end of the first extending part and an outer end of the second extending part; and
wherein the movable part is connected to the shaft protruding on outside in the axial direction from the housing, one end of the shaft being connected to a vibration isolation target.

11. A vibration isolator comprising:
a housing made of non-magnetic material;
a swingable shaft swingably disposed inside the housing, wherein at least one end thereof is connected to an outside;
an exciting coil that is disposed inside the housing and applies a magnetic force:
a magnetic viscoelastic elastomer disposed to be elastically deformed by the input force from the swingable shaft, the magnetic viscoelastic elastomer having an elastic modulus which is variable in accordance with a magnitude of the magnetic force applied by the exciting coil, the magnetic viscoelastic elastomer including magnetic particles in an elastic material;
at least two magnetic core parts disposed between the housing and the exciting coil to form a magnetic path through the magnetic viscoelastic elastomer,
wherein the two magnetic core parts each include:
   a hollow circular cylinder disposed at outer circumference of the swingable shaft;
   an extending part extending from one end on an outer side in an axial direction of the hollow circular cylinder toward an inside of a circumferential direction,
wherein the magnetic viscoelastic elastomer has a hollow circular cylindrical shape to connect ends, on inner sides in the axial direction, of the two magnetic core parts; and
a transmission part extending from the swingable shaft in a direction perpendicular to the axial direction and abutting an inner circumferential surface of the magnetic viscoelastic elastomer to transmit a displacement of the swingable shaft relative to the housing to the magnetic viscoelastic elastomer.

* * * * *